(12) United States Patent
Ogawa et al.

(10) Patent No.: US 9,436,000 B2
(45) Date of Patent: Sep. 6, 2016

(54) OPTICAL DEFLECTOR INCLUDING MEANDER-TYPE PIEZOELECTRIC ACTUATORS AND ILL-BALANCED MIRROR STRUCTURE

(71) Applicant: STANLEY ELECTRIC CO., LTD., Meguro-ku, Tokyo (JP)

(72) Inventors: Akio Ogawa, Yamato (JP); Keiichi Ikegami, Hachioji (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 14/667,414

(22) Filed: Mar. 24, 2015

(65) Prior Publication Data

US 2015/0277108 A1    Oct. 1, 2015

(30) Foreign Application Priority Data

Mar. 25, 2014   (JP) .................................. 2014-062708

(51) Int. Cl.
   *G02B 26/10*   (2006.01)
   *G02B 26/08*   (2006.01)

(52) U.S. Cl.
   CPC ......... *G02B 26/101* (2013.01); *G02B 26/0858* (2013.01); *G02B 26/105* (2013.01)

(58) Field of Classification Search
   CPC ............ G02B 26/101; G02B 26/0858; G02B 26/105; H01L 41/00
   See application file for complete search history.

(56) References Cited

U.S. PATENT DOCUMENTS

| | | | | |
|---|---|---|---|---|
| 5,488,862 A | * | 2/1996 | Neukermans | G01C 19/5719 73/504.02 |
| 2004/0119004 A1 | * | 6/2004 | Wine | G02B 26/0841 250/234 |
| 2005/0253055 A1 | | 11/2005 | Sprague et al. | |
| 2009/0235502 A1 | | 9/2009 | Kato et al. | |
| 2012/0243064 A1 | | 9/2012 | Tani | |
| 2013/0301103 A1 | | 11/2013 | Aimono | |

FOREIGN PATENT DOCUMENTS

JP    2008040240 A    2/2008

OTHER PUBLICATIONS

Extended European Search Report dated Jul. 13, 2015, issued in counterpart European Application No. 15160508.6.

* cited by examiner

*Primary Examiner* — Frank Font
(74) *Attorney, Agent, or Firm* — Holtz, Holtz & Volek PC

(57) ABSTRACT

An optical deflector includes a mirror structure having a symmetrical axis on a plane of the mirror structure, an outer frame surrounding the mirror structure, and at least one meander-type piezoelectric actuator coupled between the mirror structure and the outer frame and having a plurality of piezoelectric cantilevers in parallel with the symmetrical axis folded at folded portions. The mirror structure is divided into a first half portion and a second half portion along the symmetrical axis. The first half portion is close to a closest one of the folded portions, and the second half portion is far from the closest one of the folded portions. A mass of the second half portion is larger than a mass of the first half portion.

17 Claims, 16 Drawing Sheets

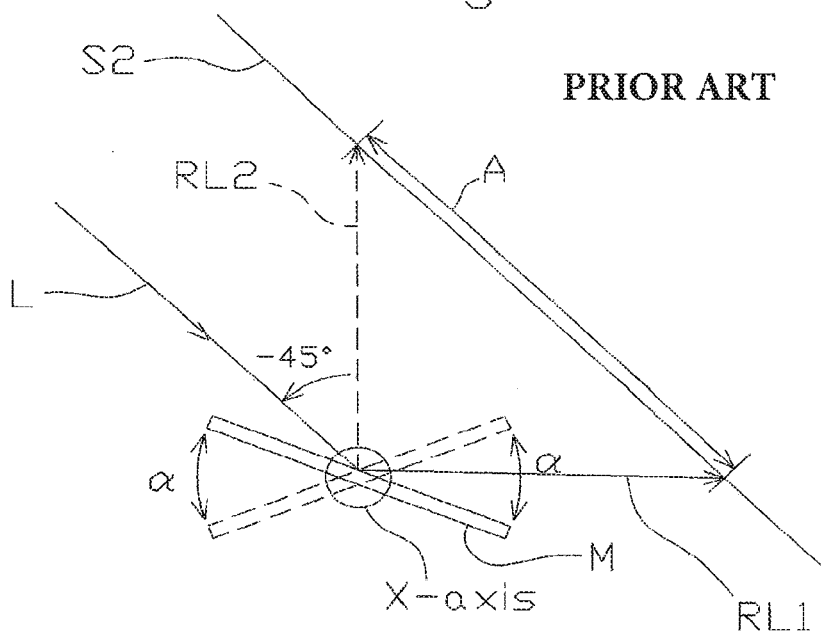
Fig. 2A PRIOR ART
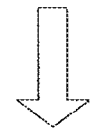
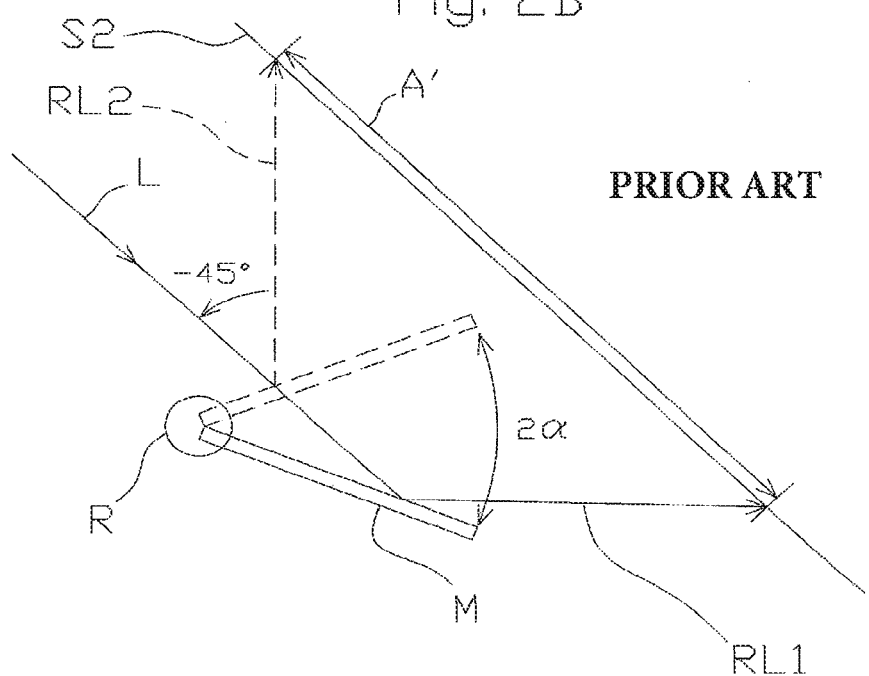
Fig. 2B PRIOR ART

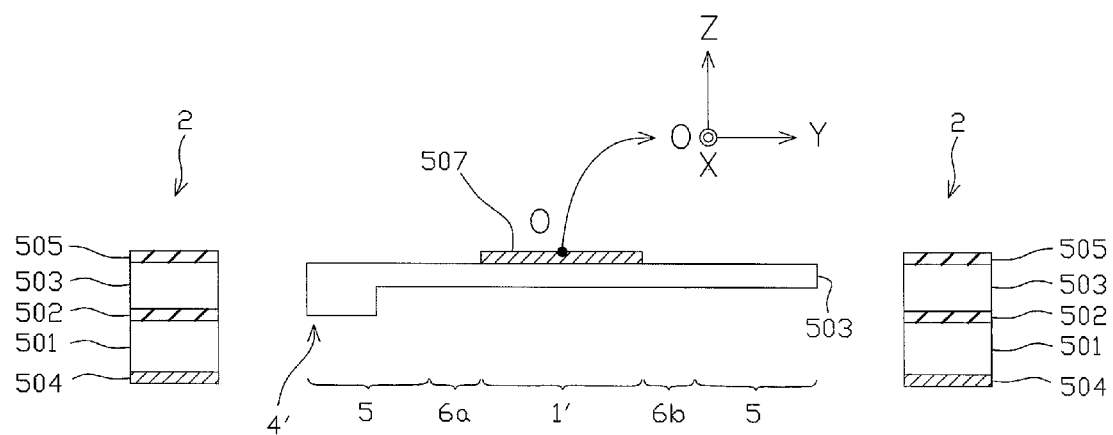
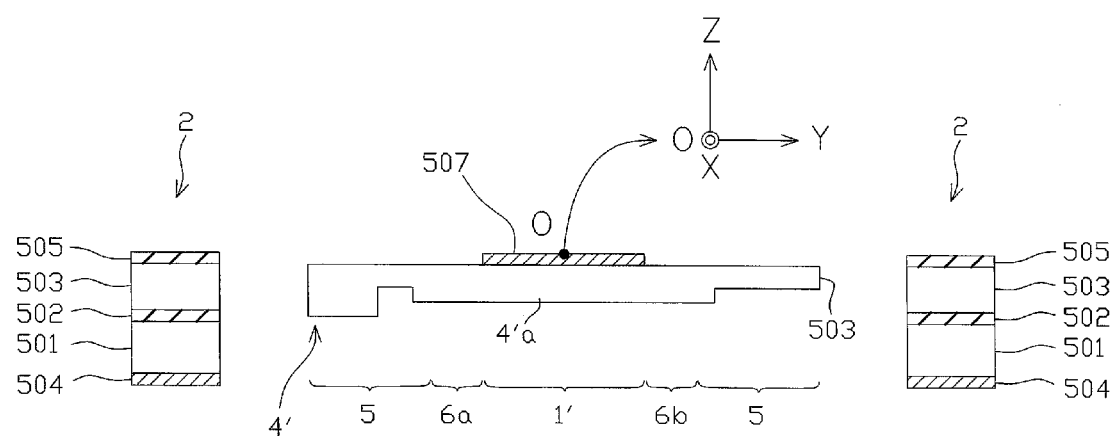

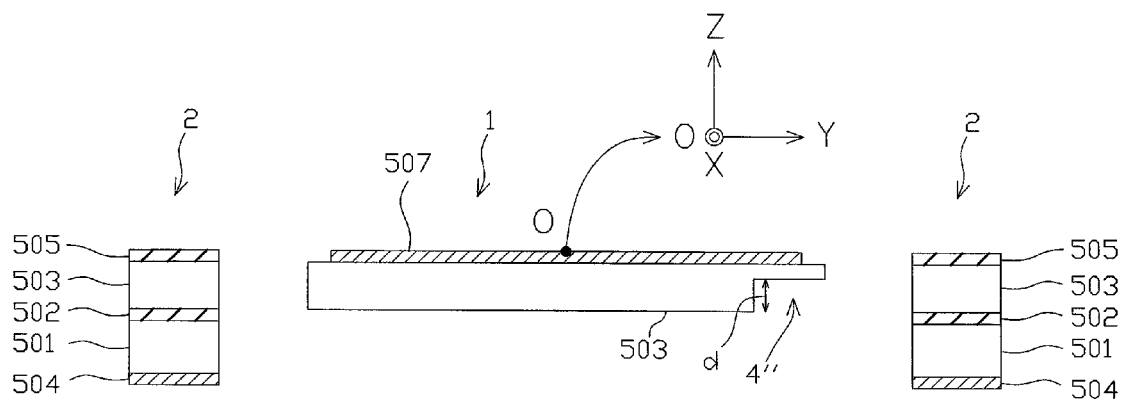
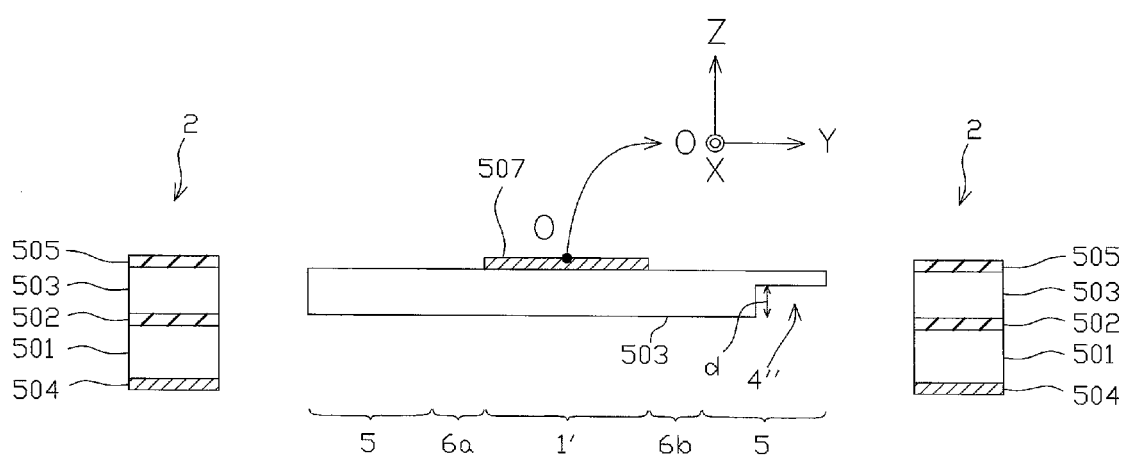

OPTICAL DEFLECTOR INCLUDING MEANDER-TYPE PIEZOELECTRIC ACTUATORS AND ILL-BALANCED MIRROR STRUCTURE

This application claims the priority benefit under 35 U.S.C. §119 to Japanese Patent Application No. JP2014-062708 filed on Mar. 25, 2014, which disclosure is hereby incorporated in its entirety by reference.

BACKGROUND

1. Field

The presently disclosed subject matter relates to an optical deflector including meander-type piezoelectric actuators. The optical deflector can be applied to a laser projector, a laser radar, a bar code reader, an area sensor, and other optical apparatus, to reduce their sizes.

2. Description of the Related Art

Generally, in an optical scanner or the like, an optical deflector is constructed by a micro electro mechanical system (MEMS) device manufactured by using semiconductor manufacturing processes and micro machine technology.

A prior art optical deflector as a MEMS device is constructed by a mirror, an outer frame surrounding the mirror, and a pair of meander-type piezoelectric actuators coupled between the mirror and the outer frame and serving as cantilevers for rocking the mirror with respect to a rocking axis of the mirror (see: JP2008-040240A).

In the above-described prior art optical deflector, since the drive force by the meander-type piezoelectric actuators can be increased to increase the flexing angle, the mirror can be driven at a frequency other than the resonant frequency.

In the piezoelectric actuators, two adjacent piezoelectric cantilevers are folded at a rigid folded portion serving as a node. Therefore, when the piezoelectric cantilevers are operated, the piezoelectric cantilevers may be drawn toward the rigid folded portion. As a result, the position of the rocking axis of the mirror is deviated from that of a symmetrical axis such as an X-axis on the plane of the mirror toward the folded portion while the mirror is being rocked, so that an irradiated area cannot accurately be scanned with light reflected from the mirror.

For example, as illustrated in FIG. 1A, the rocking axis of a mirror M coincides with the symmetrical axis (X-axis), so that the mirror M is rocked around the X-axis at a flexing angle α. In this case, when laser light L is incident at an angle of 0° relative to an optical deflector, an imaginary screen S1 is irradiated with reflected lights RL1 and RL2, so that an irradiated area A can be realized on the imaginary screen S1.

On the other hand, as illustrated in FIG. 1B, when the rocking axis of the mirror M is deviated from the X-axis to a position R, the mirror M is rocked around an axis at the position R at a flexing angle 2·α. In this case, when laser light L is incident at an angle of 0° relative to the optical deflector, the imaginary screen S1 is irradiated with reflected lights RL1 and RL2, so that an irradiated area A' shifted toward the right direction can be realized on the imaginary screen S1. Thus, an image generated on the imaginary screen S1 may be shifted to the right direction.

Also, as illustrated in FIG. 2A, the rocking axis of the mirror M coincides with the X-axis, so that the mirror M is rocked around the X-axis at a flexing angle α. In this case, when laser light L is incident at an angle of −45° relative to the optical deflector, an imaginary screen S2 is irradiated with reflected lights RL1 and RL2, so that an irradiated area A can be realized on the imaginary screen S2.

On the other hand, as illustrated in FIG. 2B, when the rocking axis of the mirror M is deviated from the X-axis to a position R, the mirror M is rocked around an axis at the position R at a flexing angle 2·α. In this case, when laser light L is incident at an angle of −45° relative to the optical deflector, the imaginary screen S2 is irradiated with reflected lights RL1 and RL2, so that an enlarged irradiated area A' can be realized on the imaginary screen S2. Thus, an image generated on the imaginary screen S2 may be enlarged.

Further, as illustrated in FIG. 3A, the rocking axis of the mirror M coincides with the X-axis, so that the mirror M is rocked around the X-axis at a flexing angle α. In this case, when laser light L is incident at an angle of +45° relative to the optical deflector, an imaginary screen S3 is irradiated with reflected lights RL1 and RL2, so that an irradiated area A can be realized on the imaginary screen S3.

On the other hand, as illustrated in FIG. 3B, when the rocking axis of the mirror M is deviated from the X-axis to a position R, the mirror M is rocked around an axis at the position R at a flexing angle 2·α. In this case, when laser light L is incident at an angle of +45° relative to the optical deflector, the imaginary screen S3 is irradiated with reflected lights RL1 and RL2, so that a reduced irradiated area A' can be realized on the imaginary screen S3. Thus, a reduced image generated on the imaginary screen S3 may be obtained.

In view of the foregoing, it is required to suppress the deviation of the rocking axis of the mirror from a symmetrical axis (X-axis) on the mirror toward a folded portion of the piezoelectric cantilevers.

SUMMARY

The presently disclosed subject matter seeks to solve the above-described problems.

According to the presently disclosed subject matter, an optical deflector includes a mirror structure having a symmetrical axis on a plane of the mirror structure, an outer frame surrounding the mirror structure, and at least one meander-type piezoelectric actuator coupled between the mirror structure and the outer frame and having a plurality of piezoelectric cantilevers in parallel with the symmetrical axis folded at folded portions. The mirror structure is divided into a first half portion and a second half portion along the symmetrical axis. The first half portion is close to a closest one of the folded portions, and the second half portion is far from the closest one of the folded portions. A mass of the second half portion is larger than a mass of the first half portion.

According to the presently disclosed subject matter, since the mass of the mirror structure is ill-balanced, the deviation of the rocking axis from the symmetrical axis on the mirror structure can be suppressed.

BRIEF DESCRIPTION OF THE DRAWINGS

The above and other advantages and features of the presently disclosed subject matter will be more apparent from the following description of certain embodiments, taken in conjunction with the accompanying drawings, wherein:

FIGS. 2A and 2B are diagrams for explaining the operation modes of the conventional optical deflector where laser light is incident at an angle of −45° relative to the optical deflector;

FIGS. 13A and 13B are cross-sectional views illustrating modifications of FIG. 12;

FIGS. 15 and 16 are cross-sectional views illustrating modifications of FIGS. 5 and 12, respectively.

DETAILED DESCRIPTION OF EXEMPLARY EMBODIMENTS

Figure 1A:
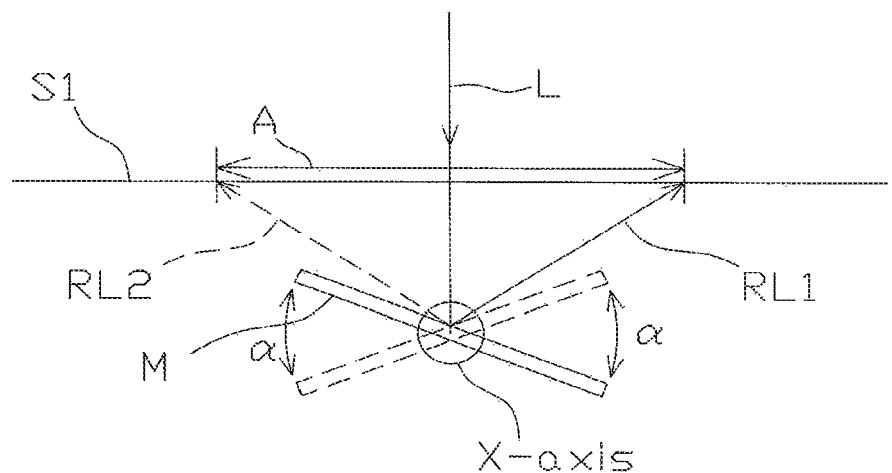
FIGS. 1A and 1B are diagrams for explaining the operation modes of a conventional optical deflector where laser light is incident at an angle of 0° relative to the optical deflector.
Figure 1B:
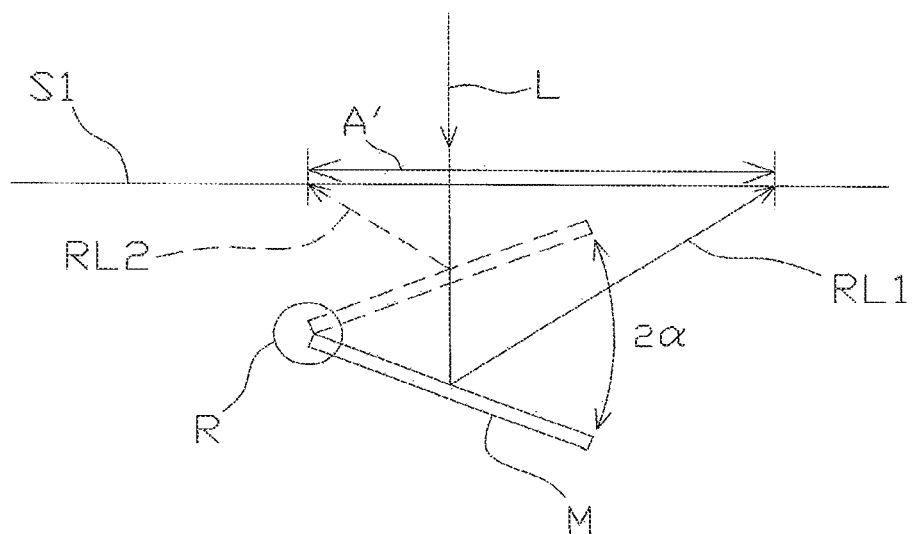
Figure 3A:
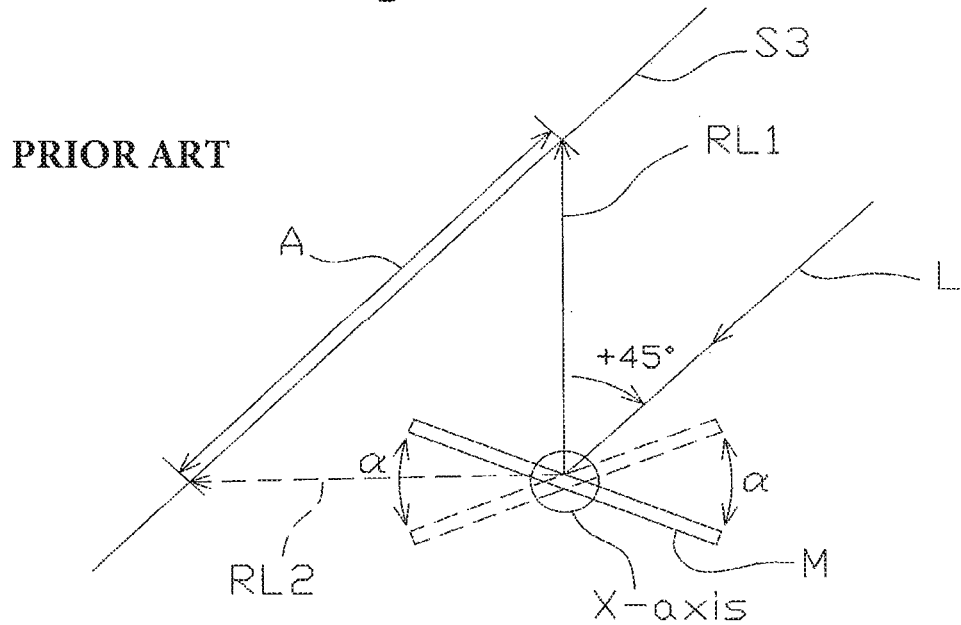
FIGS. 3A and 3B are diagrams for explaining the operation modes of the conventional optical deflector where laser light is incident at an angle of +45° relative to the optical deflector.
Figure 3B:
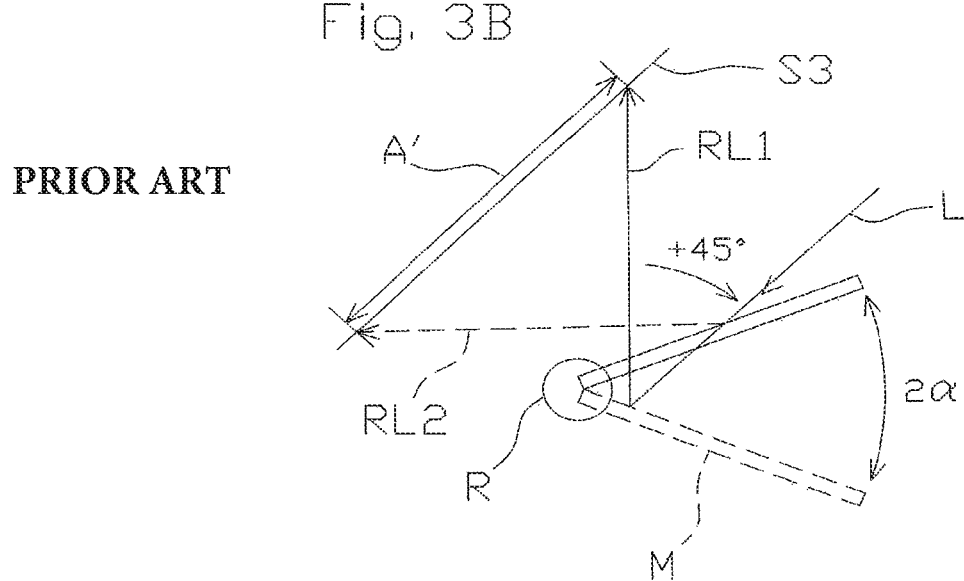
Figure 4:
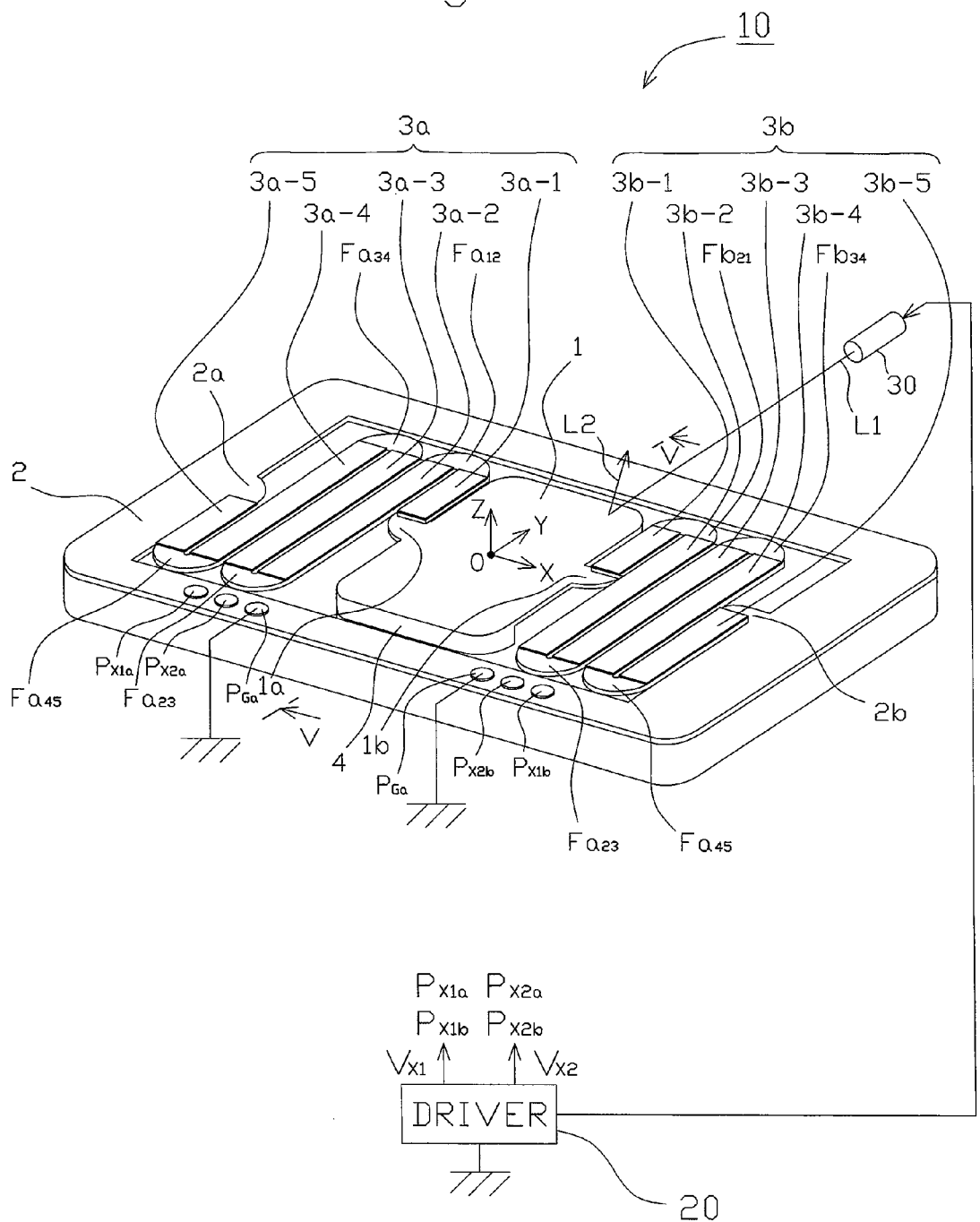
FIG. 4 is a perspective view illustrating a first embodiment of the optical deflector according to the presently disclosed subject matter.

In FIG. 4, which illustrates a first embodiment of the optical deflector according to the presently disclosed subject matter, reference numeral 10 designates a one-dimensional optical deflector, 20 designates a driver for driving the optical deflector 10, and 30 designates a laser light source.

The optical deflector 10 is constructed by a rectangular mirror 1 for receiving incident light L1 from the laser light source 30 to generate reflected light L2, an outer frame 2 surrounding the mirror 1 for supporting the mirror 1, and a pair of meander-type piezoelectric actuators 3a and 3b coupled between the mirror 1 and the outer frame 2 and serving as cantilevers for rocking the mirror 1 around a symmetrical axis, i.e., an X-axis on the plane of the mirror 1 centered at the center 0 of the mirror 1 which is also the center of the outer frame 2. The mirror 1 can be circular or square. The piezoelectric actuators 3a and 3b are arranged opposite to each other with respect to the mirror 1.

Note that another symmetrical axis, i.e., a Y-axis perpendicular to the X-axis is defined on the plane of the mirror 1, and a normal axis to the plane of the mirror 1 is defined by a Z-axis centered at the center 0 of the mirror 1.

The outer frame 2 is rectangularly-framed to surround the mirror 1 associated with the piezoelectric actuators 3a and 3b.

The piezoelectric actuator 3a is constructed by piezoelectric cantilevers 3a-1, 3a-2, 3a-3, 3a-4 and 3a-5 which are serially-coupled from the coupling portion 1a of the mirror 1 to the coupling portion 2a of the outer frame 2 via folded portions $Fa_{12}$, $Fa_{23}$, $Fa_{34}$, and $Fa_{45}$. The folded portions $Fa_{12}$ and $Fa_{34}$ are located on the positive side of the Y-axis, while the folded portions $Fa_{23}$ and $Fa_{45}$ are located on the negative side of the Y-axis. Also, each of the piezoelectric cantilevers 3a-1, 3a-2, 3a-3, 3a-4 and 3a-5 is in parallel with the Y-axis. Therefore, the piezoelectric cantilevers 3a-1, 3a-2, 3a-3, 3a-4 and 3a-5 are folded at every cantilever or meandering from the mirror 1 to the outer frame 2, so that the amplitudes of the piezoelectric cantilevers 3a-1, 3a-2, 3a-3, 3a-4 and 3a-5 can be changed along directions perpendicular to the X-axis.

Similarly, the piezoelectric actuator 3b is constructed by piezoelectric cantilevers 3b-1, 3b-2, 3b-3, 3b-4 and 3b-5 which are serially-coupled from the coupling portion 1b of the mirror 1 to the outer frame 2 via folded portions $Fb_{12}$, $Fb_{23}$, $Fb_{34}$ and $Fb_{45}$. The folded portions $Fb_{12}$ and $Fb_{34}$ are located on the positive side of the Y-axis, while the folded portions $Fb_{23}$ and $Fb_{45}$ are located on the negative side of the Y-axis. Also, each of the piezoelectric cantilevers 3b-1, 3b-2, 3b-3, 3b-4 and 3b-5 are in parallel with the Y-axis. Therefore, the piezoelectric cantilevers 3b-1, 3b-2, 3b-3, 3b-4 and 3b-5 are folded at every cantilever or meandering from the mirror 1 to the outer frame 2, so that the piezoelectric cantilevers 3b-1, 3b-2, 3b-3, 3b-4 and 3b-5 can be changed along directions perpendicular to the X-axis.

The length of each of the piezoelectric cantilevers 3a-1 and 3a-5 is about half of that of each of the piezoelectric cantilevers 3a-2, 3a-3 and 3a-4. Similarly, the length of each of the piezoelectric cantilevers 3b-1 and 3b-5 is about half of that of each of the piezoelectric cantilevers 3b-2, 3b-3 and 3b-4. Thus, the rocking axis of the mirror 1 is brought to the X-axis; however, the rocking axis of the mirror 1 may be still deviated from the X-axis.

Note that the number of piezoelectric cantilevers in each of the piezoelectric actuators 3a and 3b can be other values such as 3, 4, 6, 7, . . . .

Provided on the outer frame 2 are pads $P_{Ga}$, $P_{X1a}$, $P_{X2a}$, $P_{Gb}$, $P_{X1b}$ and $P_{X2b}$. The pads $P_{X1a}$, $P_{X1b}$, $P_{X1b}$ and $P_{X2b}$ are connected to the driver 20 which applies a drive voltage $V_{X1}$ to the pads $P_{X1a}$ and $P_{X1b}$, and applies a drive voltage $V_{X2}$ to the pads $P_{X2a}$ and $P_{X2b}$.

The pad $P_{Ga}$ for receiving the ground voltage as a reference voltage is connected via a via-structure (not shown) to the Pt lower electrode layers (not shown) of the piezoelectric cantilevers 3a-1, 3a-2, 3a-3, 3a-4 and 3a-5 of the piezoelectric actuator 3a.

The pad $P_{X1a}$ is connected via a wiring layer (not shown) to the Pt upper electrode layers (not shown) of the odd-numbered piezoelectric cantilevers 3a-1, 3a-3 and 3a-5 of the piezoelectric actuator 3a.

The pad $P_{X2a}$ is connected via a wiring layer (not shown) to the Pt upper electrode layers (not shown) of the even-numbered piezoelectric cantilevers 3a-2 and 3a-4 of the piezoelectric actuator 3a.

The pad $P_{Gb}$ for receiving the ground voltage is connected via a via-structure (not shown) to the Pt lower electrode layers (not shown) of the piezoelectric cantilevers 3b-1, 3b-2, 3b-3, 3b-4 and 3b-5 of the piezoelectric actuator 3b.

The pad $P_{X1b}$ is connected via a wiring layer (not shown) to the Pt upper electrode layers (not shown) of the odd-numbered piezoelectric cantilevers 3b-1, 3b-3 and 3b-5 of the piezoelectric actuator 3b.

The pad $P_{X2b}$ is connected via a wiring layer (not shown) to the Pt upper electrode layers (not shown) of the even-numbered piezoelectric cantilevers 3b-2 and 3b-4 of the outer piezoelectric actuator 3b.

A weight 4 having a height "h" of several μm is protruded from the rear side of the mirror 1. In this case, the weight 4 is in parallel with the X-axis on the negative side of the Y-axis.

The driver 20 is constructed by a control circuit such as a microcomputer including a central processing unit (CPU), a read-only memory (ROM) or a nonvolatile memory, a random access memory (RAM), an input/output (I/O) interface and the like.

In FIG. 4, light L1 emitted from the light source 30 is reflected by the mirror 1, and then, light L2 reflected from the mirror 1 is deflected by the optical deflector 10. Thus, an irradiated area of an imaginary screen (not shown) is scanned with the deflected reflected light L2.

The structure of the optical deflector 10 is explained next with reference to FIG. 5 which is a cross-sectional view taken along the V-V line in FIG. 4.

Figure 5:
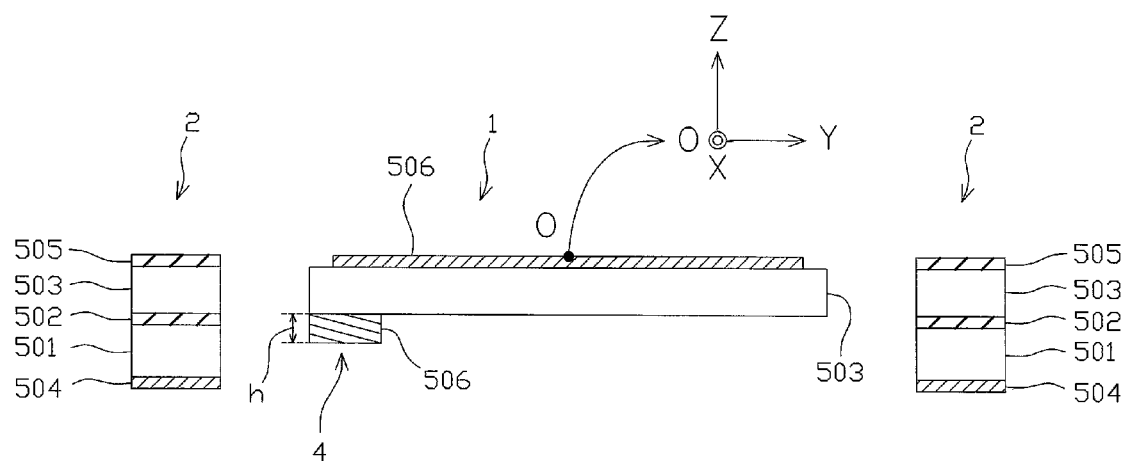
FIG. 5 is a cross-sectional view taken along the line V-V in FIG. 4.

In FIG. 5, a monocrystalline silicon support layer ("Handle" layer) 501, an intermediate silicon dioxide layer ("Box" layer) 502 and a monocrystalline silicon active layer ("Device" layer) 503 are formed by a silicon-on-insulator (SOI) substrate. Also, an aluminum layer 504 is deposited on the rear surface of the SOI substrate by an evaporation process, and a silicon dioxide layer 505 is formed on the front surface of the SOT by a thermal oxidizing process.

The mirror 1 is constructed by the "Device" layer 503 serving as a vibration plate and the reflective metal layer 506 serving as a reflector. The reflective metal layer 506 is formed by forming a resist pattern of the reflective metal layer 506 using a photolithography process, depositing Ti and Ag on the resist pattern by a sputtering process, and carrying out a lift-off process to remove the resist pattern.

The outer frame 2 is constructed by the "Handle" layer 501, the "Box" layer 502, the "Device" layer 503, the aluminum layer 504 and the silicon dioxide layer 505.

Each of the piezoelectric cantilevers 3a-1 to 3a-5 and 3b-1 to 3b-5 is constructed by the "Box" layer 502, the "Device" layer 503, the silicon dioxide layer 504, the Pt lower electrode layer (not shown), the lead titanate zirconate (PZT) layer (not shown) and the Pt upper electrode layer (not shown).

The pads $P_{Ga}$, $P_{X1a}$, $P_{X2a}$, $P_{Gb}$, $P_{X1b}$ and $P_{X2b}$ are constructed by the pad metal layer (not shown).

Figure 6A:
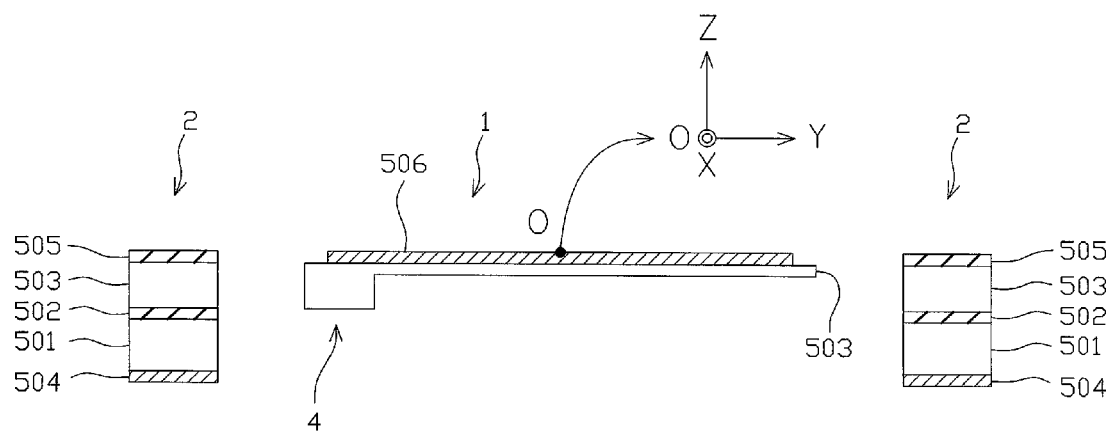
FIGS. 6A and 6B are cross-sectional views illustrating modifications of FIG. 5.
Figure 6B:
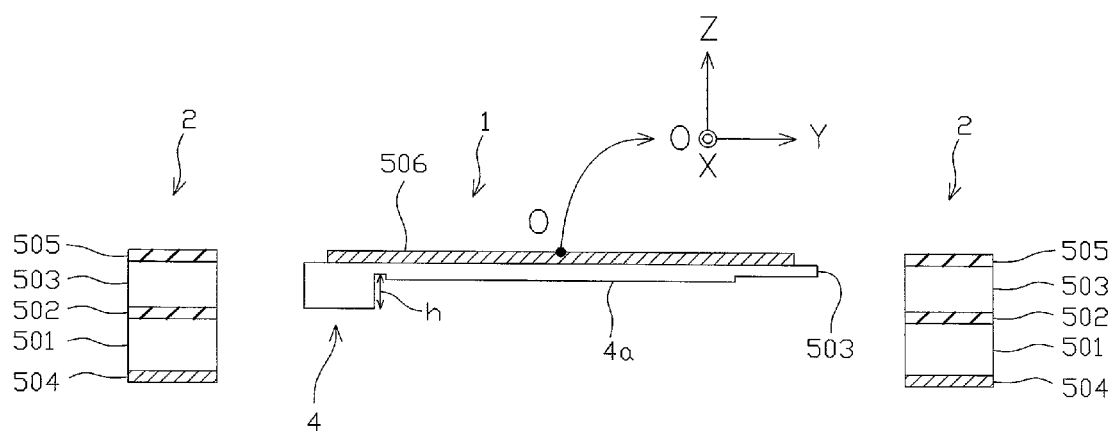

The weight 4 is formed by etching the "Box" layer 502 to expose the "Device" layer 503, and then, by depositing a metal pattern layer made of Al, Au, Mo, Ni and/or Ti by a lift-off process. Otherwise, as illustrated in FIG. 6A, a part of the "Device" layer 503 except for a portion corresponding to the weight 4 is etched, so that the protruded portion of the "Device" layer 503 serves as the weight 4. In this case, as illustrated in FIG. 6B, a reinforcement member 4a can be adhered to the rear surface of the mirror 1 to reinforce the thin mirror 1. Note that the reinforcement member 4a can be formed by performing a photolithography and etching process upon the "Device" layer 503.

A mirror structure is defined by the mirror 1, the "Device" layer 503 and the weight 4 (including the reinforcement member 4a).

The meander-type piezoelectric actuators 3a and 3b are described below.

In the piezoelectric actuators 3a and 3b, the piezoelectric cantilevers 3a-1, 3a-2, 3a-3, 3a-4, 3a-5, 3b-1, 3b-2, 3b-3, 3b-4 and 3b-5 are divided into an odd-numbered group of the piezoelectric cantilevers 3a-1, 3a-3 and 3a-5; 3b-1, 3b-3 and 3b-5, and an even-numbered group of the piezoelectric cantilevers 3a-2 and 3a-4; 3b-2 and 3b-4 alternating with the odd-numbered group of the piezoelectric cantilevers 3a-1, 3a-3 and 3a-5; 3b-1, 3b-3 and 3b-5.

For example, when the odd-numbered group of the piezoelectric cantilevers 3a-1, 3a-3, 3a-5, 3b-1, 3b-3 and 3b-5 are flexed in one direction, for example, in an upward direction, the even-numbered group of the piezoelectric cantilevers 3a-2, 3a-4, 3b-2 and 3b-4 are flexed in the other direction, i.e., in a downward direction. On the other hand, when the odd-numbered group of the piezoelectric cantilevers 3a-1, 3a-3, 3a-5, 3b-1, 3b-3 and 3b-5 are flexed in the downward direction, the even-numbered group of the piezoelectric cantilevers 3a-2, 3a-4, 3b-2 and 3b-4 are flexed in the upward direction. In this case, since the length of each of the piezoelectric cantilevers 3a-1, 3a-5, 3b-1 and 3b-5 is about half of that of each of the piezoelectric cantilevers 3a-2, 3a-3, 3a-4, 3b-2, 3b-3 and 3b-4, the flexing amounts of the piezoelectric cantilevers 3a-1, 3a-5, 3b-1 and 3b-5 are about half of those of the piezoelectric cantilevers 3a-2, 3a-3, 3a-4, 3b-2, 3b-3 and 3b-4.

Thus, the mirror 1 is rocked around the X-axis.

An optical deflection by rocking the mirror 1 around the X-axis is explained with reference to FIGS. 7A and 7B.

Figure 7A:
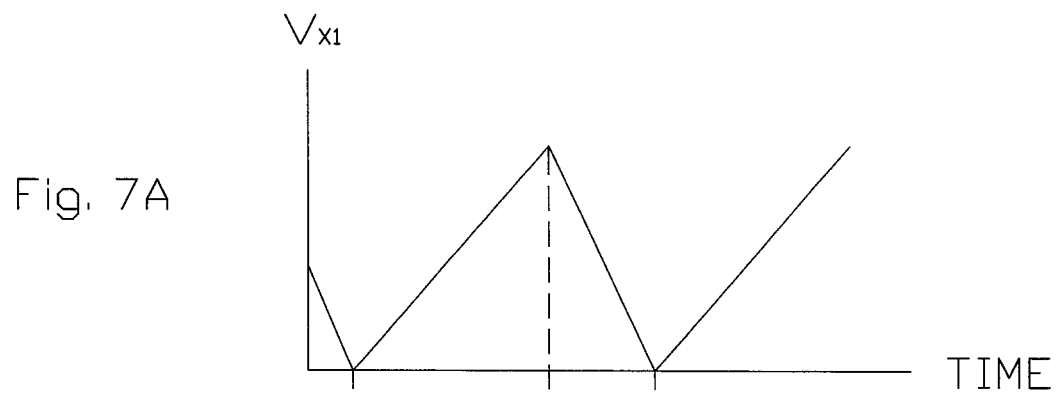
FIGS. 7A and 7B are timing diagrams for illustrating examples of the drive voltages of the optical deflector of FIG. 4.
Figure 7B:
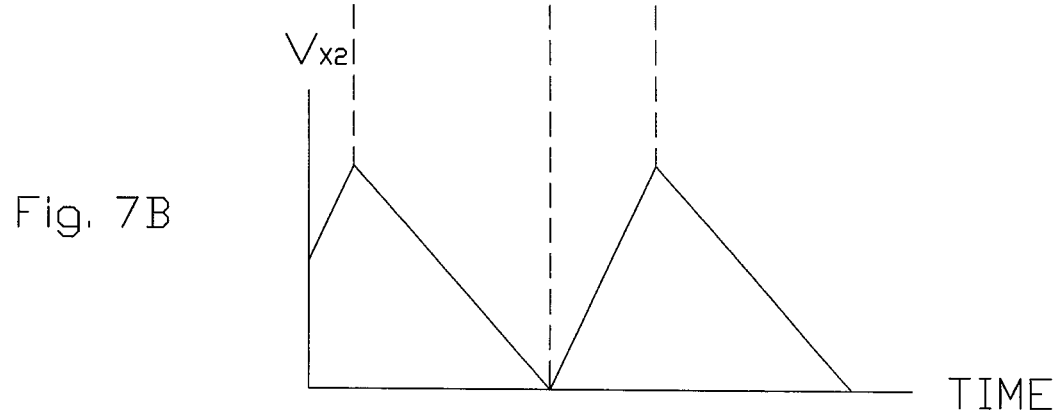

For example, the drive voltage $V_{X1}$ applied to the pads $P_{X1a}$ and $P_{X1b}$ is saw-tooth-shaped as illustrated in FIG. 7A, and the drive voltage $V_{X2}$ applied to the pads $P_{X2a}$ and $P_{X2b}$ is saw-tooth-shaped as illustrated in FIG. 7B. That is, the drive voltages $V_{X1}$ and $V_{X2}$ are opposite in phase to each other. In this case, the frequency of the drive voltages $V_{X1}$ and $V_{X2}$ is 60 Hz, for example, much lower than the resonant frequency.

Figure 8:
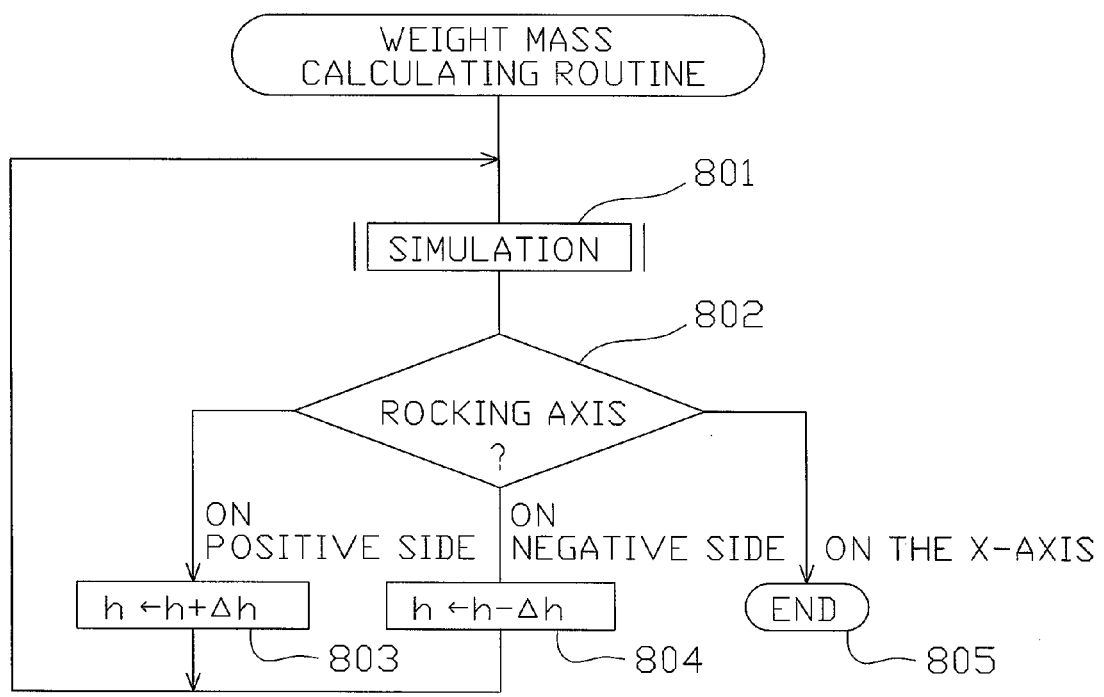
FIG. 8 is a flowchart for explaining the calculation of the mass of the weight of FIG. 4.

The mass of the weight 4 is determined by a weight mass calculating routine as illustrated in FIG. 8 which is carried out by a microcomputer. Note that if the weight 4 has a definite area, the mass of the weight 4 is defined by its height "h", and therefore, the height "h" is initialized at h0 (h=h0).

First, at step 801, a simulation is carried out to calculate flexing amounts along the Z-axis at one natural resonant frequency.

Figure 9A:
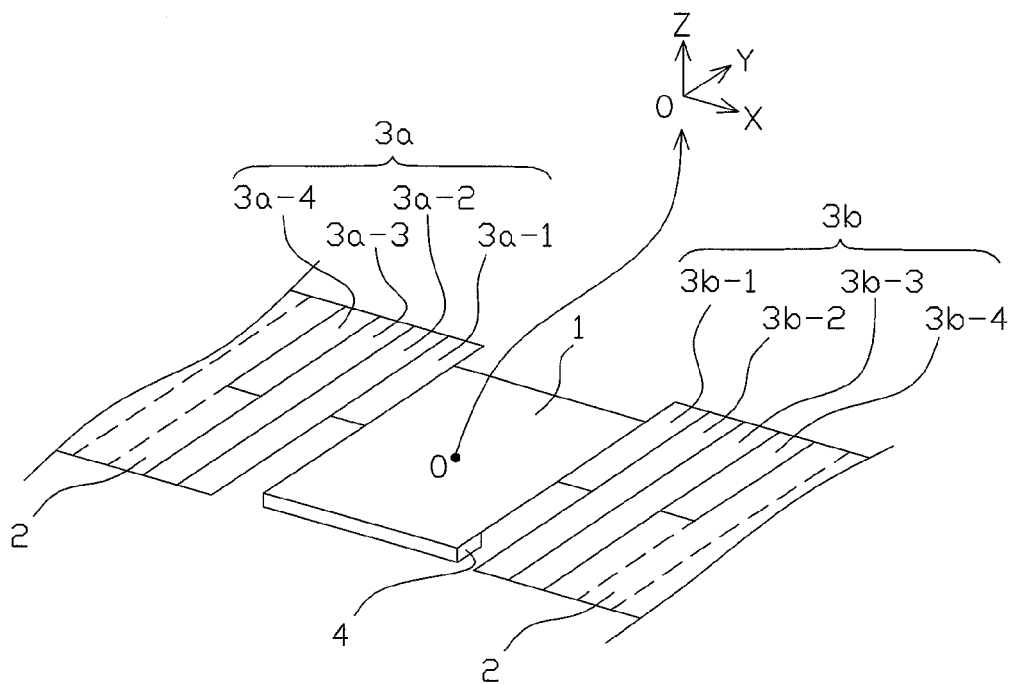
FIGS. 9A and 9B are perspective views of an optical deflector used in the simulation step of FIG. 8.
Figure 9B:
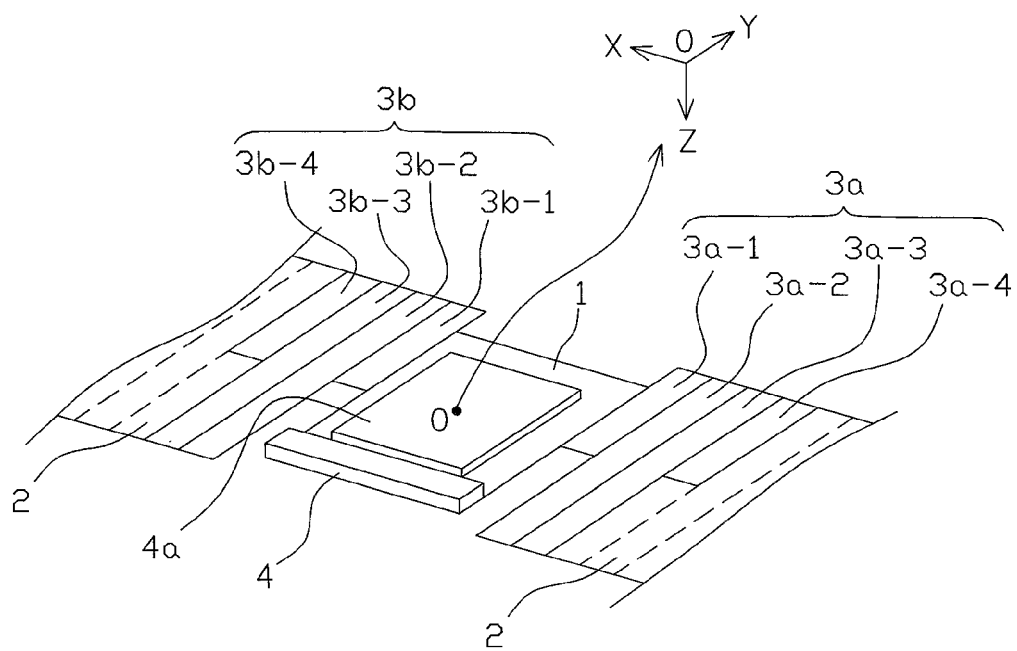

In order to carry out the above-mentioned simulation, the optical deflector of FIG. 6B is simplified into an optical deflector as illustrated in FIGS. 9A and 9B, which are a front-side perspective view and a rear-side perspective view. In FIGS. 9A and 9B, the number of the piezoelectric cantilevers in each of the piezoelectric actuators 3a and 3b is four. Also, the outer frame 2 is fixed. The software used for this simulation is Oofelie (registered trademark) provided by Open-Engineering, which carries out mode analysis by a finite element method (FEM) to calculate flexing amounts at one natural resonant frequency. The conditions of the simulation software are as follows:

(a) shape of weights such as width, length and height;
(b) number of weights;
(c) densities of weights; and
(d) locations of weights.

Concretely, the above-mentioned conditions for the weight 4 of the optical deflector of FIGS. 9A and 9B were determined as follows:

(1) The weight 4 was located at the outermost location of the negative side of the Y-axis of the mirror 1.
(2) The shape, number and density of the weight 4 were arbitrary; however, the center of gravity of the weight 4 was located on the Y-axis. That is, the weight 4 can be divided into a plurality of pieces; however, even in this case, the center of gravity of the pieces was located on the Y-axis.

Figure 10A:
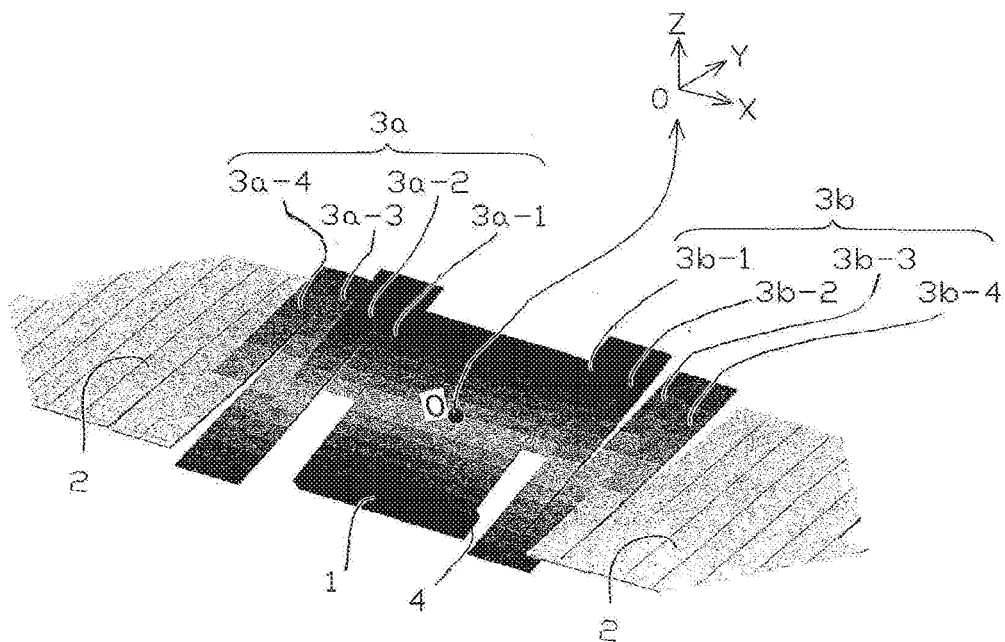
FIGS. 10A and 10B are perspective views of the optical deflector illustrating the flexing amounts realized at the simulation step of FIG. 8.
Figure 10B:
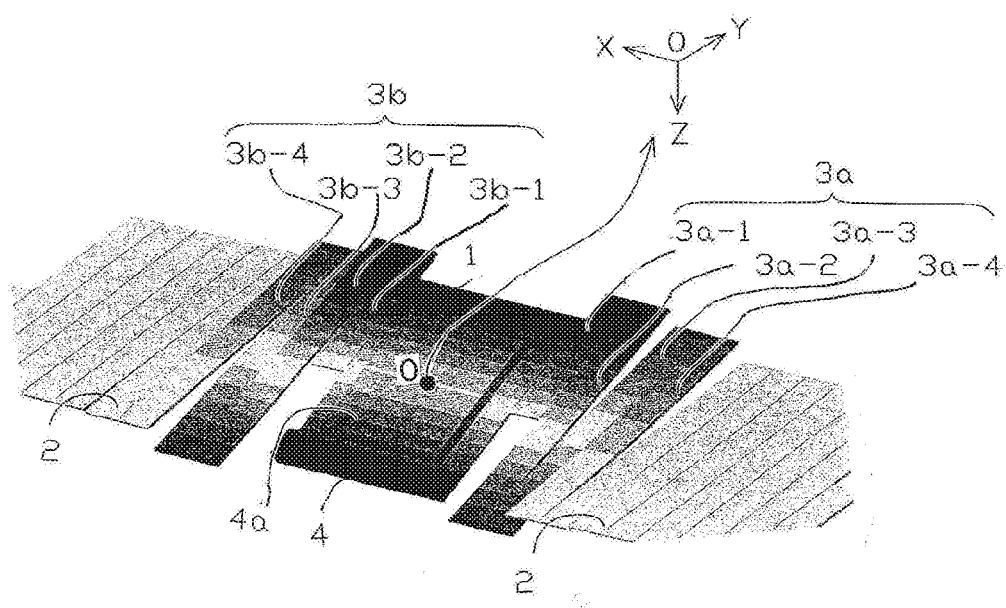

The result of the simulation at step 801 is illustrated in FIGS. 10A and 10B which correspond to FIGS. 9A and 9B, respectively. In FIGS. 10A and 10B, the darker, the larger the flexing amounts along the Z-axis. The flexing amounts are zero at the blank regions, so that the rocking axis is determined to be zero at the blank regions.

Next, at step 802, it is determined whether the rocking axis of the mirror 1 is located on the positive side of the Y-axis, on the negative side of the Y-axis, or on the X-axis.

When the rocking axis of the mirror 1 is determined to be on the positive side of the Y-axis at step 802, the control proceeds to step 803 which increases the mass of the weight 4, i.e., by increasing the height "h" by Δh, and then, the control returns to step 801.

When the rocking axis of the mirror 1 is determined to be on the negative side of the Y-axis at step 802, the control proceeds to step 803 which decreases the mass of the weight 4, i.e., by decreasing the height "h" by Δh, and then, the control returns to step 801.

When the rocking axis of the mirror 1 is determined to be on the X-axis at step 807, the control proceeds to step 805, thus completing the routine of FIG. 8.

Thus, the mass of the weight 4, i.e., the height "h" of the weight 4 is determined, so that the rocking axis of the mirror 1 is located on the X-axis.

In FIG. 8, instead of changing the mass of the weight 4, i.e., the height "h" of the weight 4, the location "y" of the weight 4 in the Y-axis can be changed. For example, at step 803, the location "y" of the weight 4 is decreased by Δy, i.e., $$y \leftarrow y - \Delta y$$

where Δy is a positive value. On the other hand, at step 804, the location "y" of the weight 4 is increased by Δy, i.e., $$y \leftarrow y + \Delta y$$

Further, in FIG. 8, both of the height "h" and location "y" of the weight 4 may be changed simultaneously.

Figure 11:
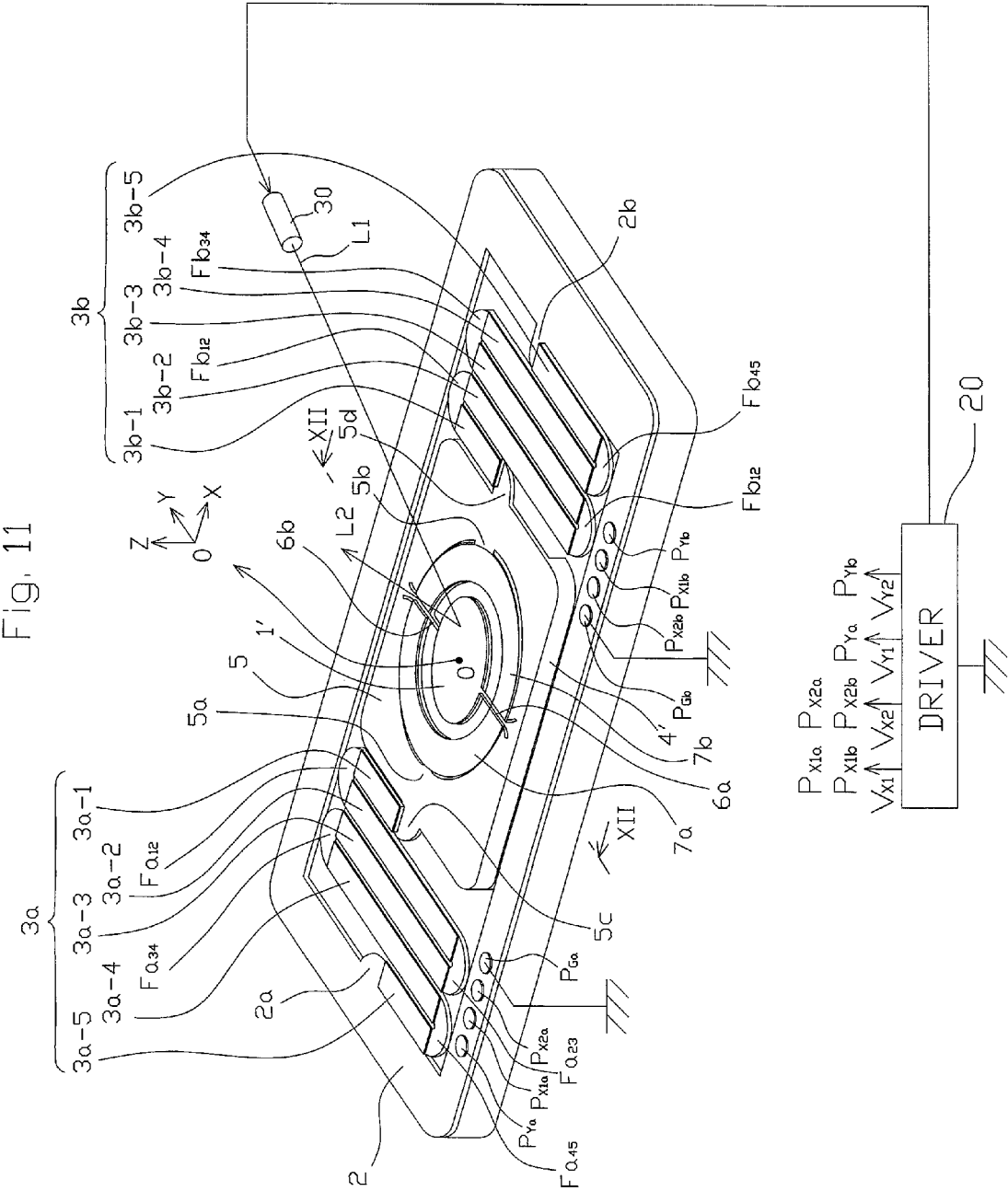
FIG. 11 is a perspective view illustrating a second embodiment of the optical deflector according to the presently disclosed subject matter.

In FIG. 11, which illustrates a second embodiment of the optical deflector according to the presently disclosed subject matter, reference numeral 10' designates a two-dimensional optical deflector.

In FIG. 11, the mirror structure of FIG. 4 is replaced by a circular mirror 1', an inner frame 5, torsion bars 6a and 6b coupled between the circular mirror 1' and the inner frame 5, a piezoelectric actuator 7a coupled between the torsion bars 6a and 6b and supported by the coupling portion 5a of the inner frame 5, and a piezoelectric actuator 7b coupled between the torsion bars 6a and 6b and supported by the coupling portion 5b of the inner frame 5. The mirror 1' can be square, hexagonal or the like. The piezoelectric actuators 7a and 7b are semi-ring shaped to surround the mirror 1'.

Also, the piezoelectric actuator 3a is coupled between the coupling portion 5c of the inner frame 5 and the coupling portion 2a of the outer frame 2. Similarly, the piezoelectric actuator 3b is coupled between the coupling portion 5d of the inner frame 5 and the coupling portion 2b of the outer frame 2.

The meander-type piezoelectric actuators 3a and 3b are of a non-resonance type, but the piezoelectric actuators 7a and 7b associated with the torsion bars 6a and 6b are of a resonance type. That is, when the rocking frequency $f_Y$ of the piezoelectric actuators 7a and 7b is close to the natural frequency of a mechanically-vibrating system of the mirror 1' with respect to the Y-axis depending upon the structure of the piezoelectric actuators 7a and 7b, the flexing angle of the mirror 1' with respect to the Y-axis can be maximized.

The torsion bars 6a and 6b are arranged along the Y-axis, and have ends coupled to the inner circumference of the inner frame 5 and other ends coupled to the outer circumference of the mirror 1'. Therefore, the torsion bars 6a and 6b are twisted by the piezoelectric actuators 7a and 7b to rock the mirror 1' with respect to the Y-axis.

The piezoelectric actuators 7a and 7b oppose each other along the X-axis and sandwich the torsion bars 6a and 6b. The piezoelectric actuators 7a and 7b have ends coupled to the inner circumference of the inner frame 5 and other ends coupled to the torsion bars 6a and 6b. In this case, the flexing direction of the piezoelectric actuator 7a is opposite to that of the piezoelectric actuator 7b.

Provided on the outer frame 2 are also pads $P_{Ya}$ and $P_{Yb}$. The pads $P_{Ya}$ and $P_{Yb}$ are connected to the driver 20 which applies a drive voltage $V_{Y1}$ to the pad $P_{Ya}$, and applies a drive voltage $V_{Y2}$ to the pad $P_{Yb}$.

The pad $P_{Ga}$ for receiving the ground voltage is also connected via a via-structure (not shown) to the Pt lower electrode layer (not shown) of the piezoelectric actuator 7a.

The pad $P_{Gb}$ for receiving the ground voltage is also connected via a via-structure (not shown) to the Pt lower electrode layer (not shown) of the piezoelectric actuator 7b.

A weight 4' having a height "h" of several μm is protruded from the rear side of the inner frame 5. Even in this case, the weight 4' is in parallel with the X-axis on the negative side of the Y-axis, i.e., the weight 4' is linear along the X-axis; however, the weight 4' can be segmental.

In FIG. 11, light L1 emitted from the light source 30 is reflected by the mirror 1, and then, light L2 reflected from the mirror 1' is deflected by the optical deflector 10'. Thus, an irradiated area of an imaginary screen (not shown) is scanned with the deflected reflected light L2.

Figure 12:
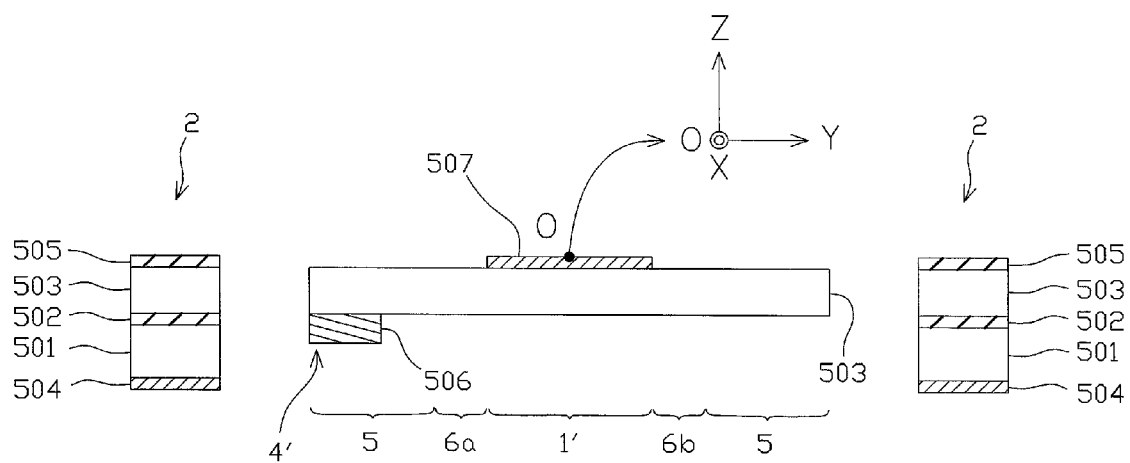
FIG. 12 is a cross-sectional view taken along the line XII-XII in FIG. 11.

The structure of the optical deflector 10' is explained next with reference to FIG. 12 which is a cross-sectional view taken along the XII-XII line in FIG. 11.

The mirror 1' is constructed by the "Device" layer 503 serving as a vibration plate and the reflective metal layer 506 serving as a reflector. The reflective metal layer 506 is formed by forming a resist pattern of the reflective metal layer 506 using a photolithography process, depositing Ti and Ag on the resist pattern by a sputtering process, and carrying out a lift-off process to remove the resist pattern.

The inner frame 5 and the torsion bars 6a and 6b are constructed by the "Device" layer 503.

Each of the piezoelectric cantilevers 7a and 7b is constructed by the "Box" layer 502, the "Device" layer 503, the silicon dioxide layer 504, the Pt lower electrode layer (not shown), the PZT layer (not shown) and the Pt upper electrode layer (not shown).

The pads $P_{Ya}$ and $P_{Yb}$ are constructed by the pad metal layer (not shown).

The weight 4' is formed by etching the "Box" layer 502 to expose the "Device" layer 503, and then, by depositing a metal pattern layer made of Al, Au, Mo, Ni and/or Ti by a lift-off process. Otherwise, as illustrated in FIG. 13A, a part of the "Device" layer 503 except for a portion corresponding to the weight 4 can be etched, so that the protruded portion of the "Device" layer 503 serves as the weight 4'. In this case, as illustrated in FIG. 13B, a reinforcement member 4'a can be adhered to the rear surface of the mirror 1' to reinforce the thin mirror 1'. Note that the reinforcement member 4a can be formed by performing a photolithography and etching process upon the "Device" layer 503.

An optical deflection by rocking the mirror 1 around the Y-axis is explained with reference to FIGS. 14A and 14B.

Figure 14A:
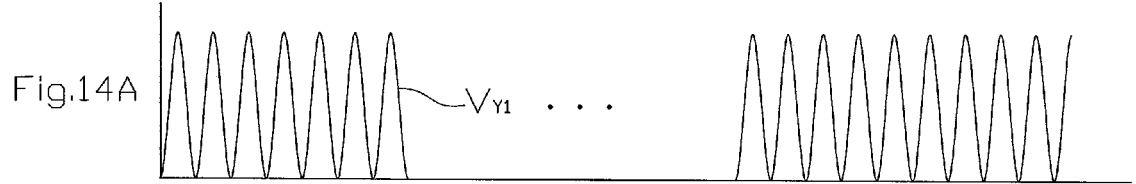
FIGS. 14A and 14B are timing diagrams for illustrating examples of the drive voltages of the optical deflector of FIG. 11.
Figure 14B:
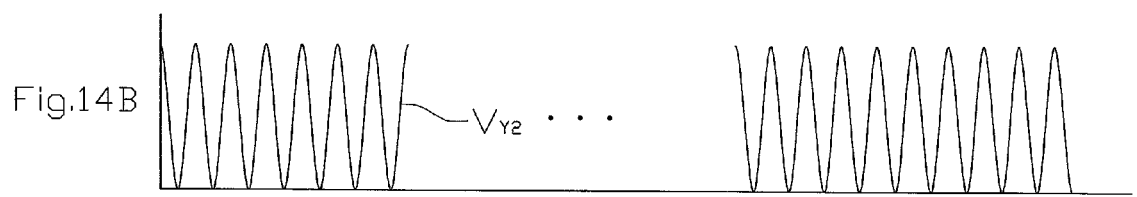

For example, the drive voltage $V_{y1}$ is sinusoidal as illustrated in FIG. 14A and the drive voltage $V_{y2}$ is sinusoidal as illustrated in FIG. 14B. That is, the drive voltages $V_{y1}$ and $V_{y2}$ are opposite in phase to each other. In this case, the frequency of the drive voltages $V_{y1}$ and $V_{y2}$ is the resonant frequency, i.e., 18 kHz, for example.

The mass of the weight 4', i.e., the height "h" of the weight 4" is also determined by a weight mass calculating routine as illustrated in FIG. 8 which is carried out by a microcomputer. Even in this case, instead of changing the mass (or height) of the weight 4', the location of the weight 4' in the Y-axis can be changed. Also, the height and location of the weight 4' can be changed simultaneously.

In the above-described embodiments, the weight 4 or 4' is provided on the negative side of the Y-axis to avoid the deviation of the rocking axis; however, instead of the weight 4 or 4', an opening 4" can be provided on the positive side of the Y-axis as illustrated in FIGS. 15 and 16.

Figure 17:
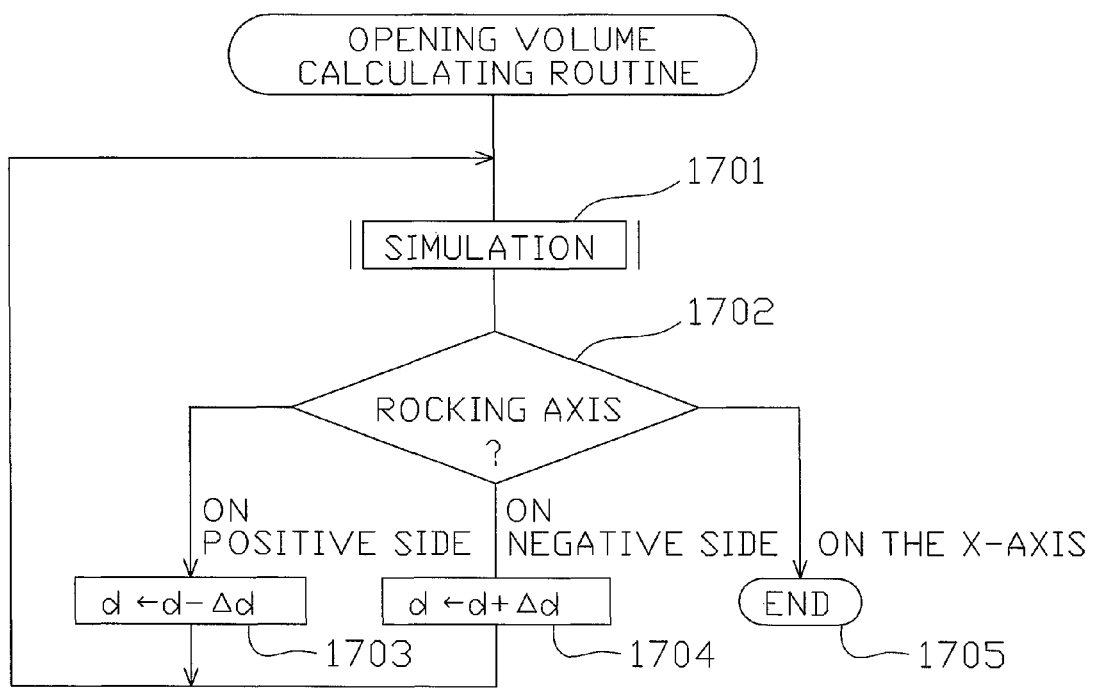
FIG. 17 is a flowchart for explaining the calculation of the volume of the opening in FIGS. 14 and 16.

The volume of the opening 4", i.e., the depth "d" of the opening 4" is determined by an opening volume calculating routine as illustrated in FIG. 17 which is carried out by a microcomputer. Note that the depth "d" of the opening 4" is initialized at d0 (d=d0).

First, at step 1701, a simulation is carried out to calculate flexing amounts along the Z-axis at one natural resonant frequency in the same way as step 801 of FIG. 8.

Next, at step 1702, it is determined whether the rocking axis of the mirror 1 (1') is located on the positive side of the Y-axis, on the negative side of the Y-axis, or on the X-axis.

When the rocking axis of the mirror 1 (1') is determined to be on the positive side of the Y-axis at step 1702, the control proceeds to step 1703 which decreases the depth "d" of the opening 4" by Δd (>0), and then, the control returns to step 1701.

When the rocking axis of the mirror 1 (1') is determined to be on the negative side of the Y-axis at step 1702, the control proceeds to step 1703 which increases the depth "d" of the opening 4" by Δd, and then, the control returns to step 1701.

When the rocking axis of the mirror 1 (1') is determined to be on the X-axis at step 1707, the control proceeds to step 1705, thus completing the routine of FIG. 17.

Even in FIG. 17, instead of the depth "d" of the opening 4", the location of the opening 4" in the Y-axis can be changed. Further, the depth "d" and location of the opening 4" can be changed simultaneously.

Thus, the volume of the opening 4" is determined, so that the rocking axis of the mirror 1 (1') is located on the X-axis.

Also, in the above-described first embodiments, two meander-type piezoelectric actuators 3a and 3b are provided; however, only one meander-type piezoelectric actuators can be provided.

Further, in the above-described embodiments, the X-axis and the Y-axis are perpendicular to each other; however, the angle between the X-axis and the Y-axis can be changed depending upon the shape of the mirror 1 (1').

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. An optical deflector comprising:
   a mirror structure having a symmetrical axis on a plane of said mirror structure;
   an outer frame surrounding said mirror structure; and
   at least one meander-type piezoelectric actuator coupled between said mirror structure and said outer frame and including a plurality of piezoelectric cantilevers in parallel with said symmetrical axis folded at folded portions,
   said mirror structure being divided into a first half portion and a second half portion along said symmetrical axis, said first half portion being close to a closest one of said folded portions, said second half portion being far from the closest one of said folded portions,
   a mass of said second half portion being larger than a mass of said first half portion.

2. The optical deflector as set forth in claim 1, wherein said second half portion includes a weight.

3. The optical deflector as set forth in claim 1, said mirror structure includes a reinforcement member on a rear surface of said mirror structure.

4. The optical deflector as set forth in claim 1, wherein an opening is provided in said first half portion.

5. The optical deflector as set forth in claim 4, wherein said mirror structure comprises:
   a mirror;
   an inner frame coupled to said meander-type piezoelectric actuators;
   a pair of torsion bars coupled between said mirror and said inner frame; and
   a pair of semi-ring shaped piezoelectric actuators coupled between said torsion bars and supported by said inner frame,
   a mass of a portion of said inner frame belonging to said second half portion being larger than a mass of a portion of said inner frame belonging to said first half portion.

6. The optical deflector as set forth in claim 5, wherein the portion of said inner frame belonging to said second half portion includes a weight.

7. The optical deflector as set forth in claim 5, wherein an opening is formed in the portion of said inner frame belonging to said first half portion.

8. An optical deflector comprising:
   a mirror having first and second symmetrical axes;
   an outer frame surrounding said mirror;
   at least one meander-type piezoelectric actuator including a plurality of piezoelectric cantilevers in parallel with said second symmetrical axis folded at folded portions and coupled between said mirror and said outer frame,
   said mirror being divided by said first symmetrical axis into first and second half portions, said first half portion being close to a closest one of said folded portions and said second half portion being far from said closest folded portion,
   a mass of said second half portion being larger than a mass of said first half portion.

9. The optical deflector as set forth in claim 8, wherein said second half portion includes a weight.

10. The optical deflector as set forth in claim 9, wherein said mirror includes a reinforcement member on a rear surface of said mirror.

11. The optical deflector as set forth in claim 8, wherein an opening is provided in said first half portion.

12. The optical deflector as set forth in claim 8, wherein an angle between said first and second symmetrical axes is changed depending upon a shape of said mirror.

13. An optical deflector comprising:
   a mirror having first and second symmetrical axes;
   an inner frame surrounding said mirror;
   a pair of torsion bars coupled between said mirror and said inner frame;
   a pair of semi-ring shaped piezoelectric actuators coupled between said torsion bars and supported by said inner frame;
   at least one meander-type piezoelectric actuator including a plurality of piezoelectric cantilevers in parallel with said second symmetrical axis folded at folded portions and coupled between said inner frame and said outer frame,
   said inner frame being divided by said first symmetrical axis into first and second half portions, said first half portion being close to a closest one of said folded portions and said second half portion being far from said closest folded portion,
   a mass of said second half portion being larger than a mass of said first half portion.

14. The optical deflector as set forth in claim 13, wherein said second half portion includes a weight.

15. The optical deflector as set forth in claim 14, wherein said mirror includes a reinforcement member on a rear surface of said inner frame.

16. The optical deflector as set forth in claim 13, wherein an opening is provided in said first half portion.

17. The optical deflector as set forth in claim 13, wherein an angle between said first and second symmetrical axes is changed depending upon a shape of said mirror.

* * * * *